United States Patent
Krikorian et al.

(10) Patent No.: US 7,202,812 B2
(45) Date of Patent: Apr. 10, 2007

(54) TECHNIQUE FOR COMPENSATION OF TRANSMIT LEAKAGE IN RADAR RECEIVER

(75) Inventors: Kapriel V. Krikorian, Calabasas, CA (US); Robert A. Rosen, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 181 days.

(21) Appl. No.: 11/144,131

(22) Filed: Jun. 3, 2005

(65) Prior Publication Data

US 2006/0273952 A1    Dec. 7, 2006

(51) Int. Cl.
*G01S 13/00* (2006.01)
*G01S 7/28* (2006.01)

(52) U.S. Cl. .................. 342/198; 342/159; 342/195; 342/196

(58) Field of Classification Search ................ 342/198, 342/159, 195, 196, 89, 93, 379
See application file for complete search history.

(56) References Cited

U.S. PATENT DOCUMENTS

| | | | | |
|---|---|---|---|---|
| 3,727,220 | A * | 4/1973 | Brennan et al. | 342/89 |
| 5,309,378 | A * | 5/1994 | Beierle | 700/280 |
| 5,581,495 | A * | 12/1996 | Adkins et al. | 708/319 |
| 5,872,540 | A * | 2/1999 | Casabona et al. | 342/362 |
| 6,664,920 | B1 * | 12/2003 | Mott et al. | 342/129 |
| 6,904,444 | B2 * | 6/2005 | Picciolo et al. | 708/322 |
| 2002/0198914 | A1 * | 12/2002 | Picciolo et al. | 708/322 |
| 2006/0273952 | A1 * | 12/2006 | Krikorian et al. | 342/198 |

FOREIGN PATENT DOCUMENTS

JP    04264285 A  *  9/1992

OTHER PUBLICATIONS

Kaihui Lin et al: "A digital leakage cancellation scheme for onostatic FMCW Radar" Microwave Symposium Digest, 2004 IEEE MTT-S International, Jun. 6-11, 2004, Piscathaway NJ vol. 2, Jun. 6, 2004 pp. 747-750 XP010726205, ISBN 0-7803-8331-1, whole document.

* cited by examiner

*Primary Examiner*—John B. Sotomayor
(74) *Attorney, Agent, or Firm*—Leonard A. Alkov

(57) ABSTRACT

A radar system (500) radiates a radar transmit signal, has a radar signal receiver (503) and a canceller (505) for canceling leakage of the transmit signal into the radar signal receiver (503). The canceller (505) comprises a digital waveform generator (528) for generating a first digital signal converted to an analog waveform. The analog waveform is amplified after a fixed delay (534) to generate a first cancellation signal input into a circulator (504). The circulator combines the first cancellation signal with the leakage to generate a first corrected signal. A summer (507) combines the first corrected signal from the circulator with a second cancellation signal to generate a second corrected signal. The second cancellation signal is generated by a digital cancellation filter (526). The digital cancellation filter (526) has as an input the first digital signal from the digital waveform generator (528). The digital cancellation filter (526) is controlled using weight adjustments computed by an adaptive weight processor (518). The adaptive weight processor (518) samples the second corrected signal and computes the weight adjustments to optimize the second cancellation signal.

10 Claims, 5 Drawing Sheets

TECHNIQUE FOR COMPENSATION OF TRANSMIT LEAKAGE IN RADAR RECEIVER

BACKGROUND OF THE INVENTION

1. Field of Invention

This invention is in the field of leakage cancellation of a radar transmit signal into a receiver.

2. Description of the Related Art

A radar transmits a transmit signal as well as receives a return radar signal. By necessity, the transmit signal is far more powerful than the received signal, as the received signal is reflected by the target and attenuated by a factor of (Range to Target)$^4$. Because of this attenuation of the reflected return radar signal, very sensitive receivers are employed to assure its reception.

Historically, the sensitive receiver is switched off, or decoupled from the microwave path while a radar signal is being transmitted. This decoupling during transmit time avoids saturating or damaging the sensitive receiver by the presence of the overwhelmingly powerful transmitter output. Some applications however, require both the transmit signal and receiver to be operating concurrently. During such operation, special provisions are made to avoid leakage of the transmitter power into the receiver. Prior attempts to reduce signal leakage into the receiver have been limited to multi-frequency simultaneous transmit and receive (STAR) systems where a separation between transmit and receive frequencies exists. Another approach is is to use short range same frequency STAR systems.

SUMMARY OF THE INVENTION

A radar system radiates a radar transmit signal, has a radar signal receiver for receiving reflected returns of said radar transmit signal, and a canceller for canceling leakage of the transmit signal into the radar signal receiver. The canceller comprises a digital waveform generator for generating a first digital signal converted to an analog waveform. The analog waveform is amplified after a fixed delay to generate a first cancellation signal input into a circulator. The circulator combines the first cancellation signal with the leakage to generate a first corrected signal.

A summer combines the first corrected signal from the circulator with a second cancellation signal to generate a second corrected signal. The second cancellation signal is generated by a digital cancellation filter. The digital cancellation filter has as an input the first digital signal from the digital waveform generator. The digital cancellation filter is controlled using weight adjustments computed by an adaptive weight processor. The adaptive weight processor samples the second corrected signal and computes the weight adjustments to optimize the second cancellation signal.

The second cancellation signal is sampled from an analog form to a digital representation for processing by the adaptive weight processor using an analog to digital converter and a first bandpass filter. The second cancellation signal is digitally described by the digital cancellation filter and converted into analog form by a digital to analog converter.

In one embodiment, the digital cancellation filter uses a finite impulse response filter responsive to the weight adjustments. In another embodiment, the digital cancellation filter performs a Fast Fourier Transform to generate a frequency domain signal. The weight adjustments are computed by the adaptive weight processor to operate on the frequency domain signal.

DETAILED DESCRIPTION OF THE INVENTION

The present invention describes an apparatus and method for canceling or reducing the effects of signal leakage from a radar transmitter into a radar signal receiver.

Figure 1:
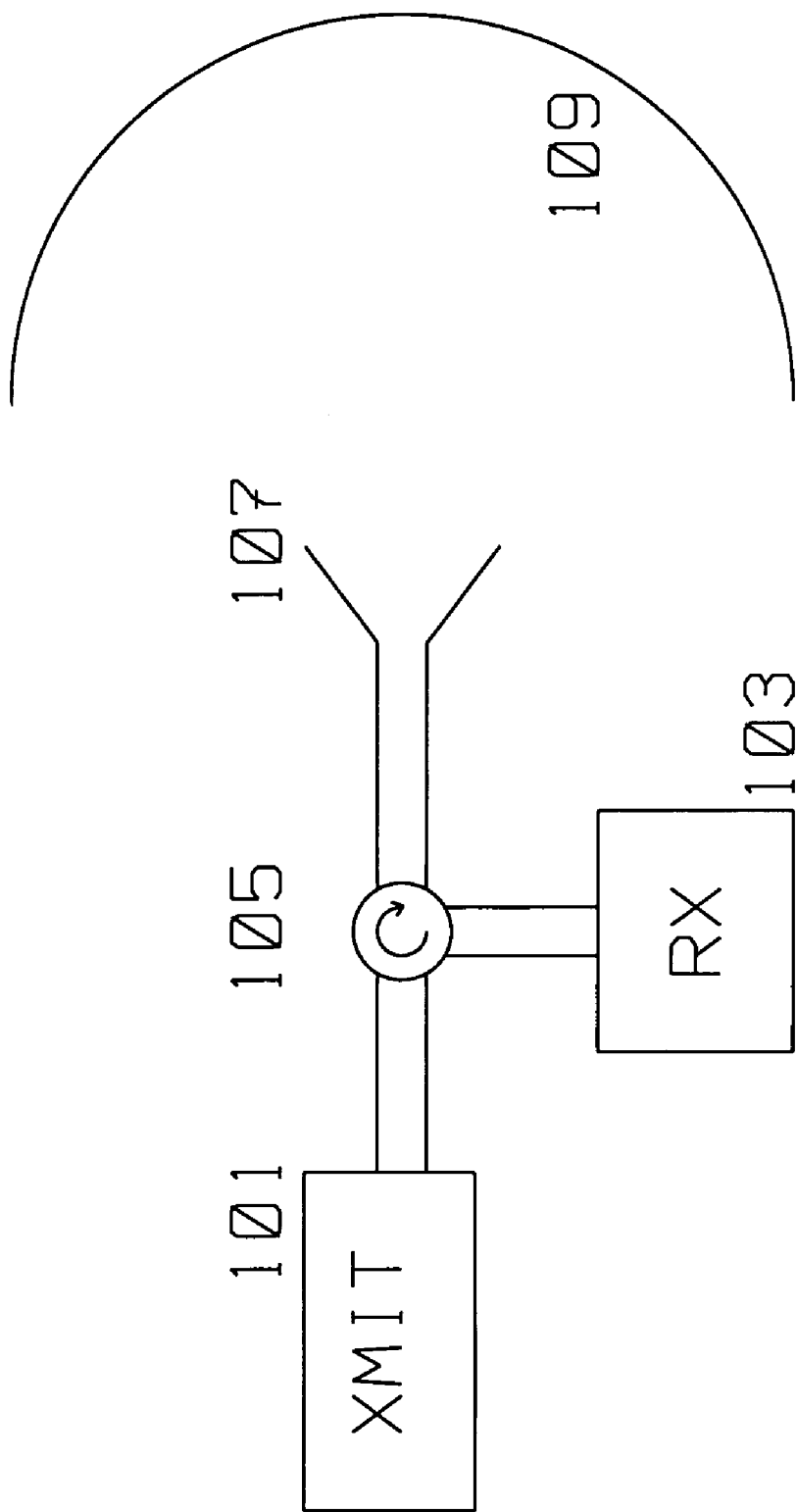
FIG. 1 is a radar transmitter of the prior art.

FIG. 1 shows a typical configuration of the prior art. Transmitter 101 is switched using circulator (switch) 105 to antenna 107 during radar signal transmission. Circulator (switch) 105 decouples receiver 103 during radar signal transmission. Radome 109 protects antenna 107 from rain and other influences. Receiver 103 is very sensitive as it has to detect radar signal reflections returned from a target miles away. Thus, the energy from transmitter 101 is always kept separate from Receiver 103 as Receiver 103 may be damaged or saturated by the powerful transmit signal from transmitter 101. The power to be detected by receiver 103, $P_R$ is generally proportional to:

$$P_R = \frac{P_T \sigma}{R^4} \qquad 1$$

where $P_T$ is transmitter 101 power, $\sigma$ is target crossection reflecting the power transmitted from transmitter 101 from a distance R away. Thus, in the configuration shown in FIG. 1, circulator (switch) 105 blocks the power $P_T$ of transmitter 101 from reaching receiver 103 during transmit times. This allows receiver 103 to be sensitive to relatively low level signals reflected from the target.

In certain radar applications, such as simultaneous transmit and receive (STAR) systems, it is desired to both transmit a radar signal and receive its reflection at the same time. In such a STAR configuration the receiver/transmitter de-coupling benefit of switch 105 of FIG. 1 my not be sufficient. Thus receiver 103 has to tolerate leakage energy generated by transmitter 101 while still proving sufficient sensitivity to function as outlined in equation 1. A prior art approach has been to provide separation between transmit and receive frequencies, or limit the range of the STAR radar.

To avoid the problems of the prior art, the present invention compensates for the transmit signal leakage and its variation in amplitude and phase over frequency. The invention generates a waveform as a superposition of individually attenuated and phase shifted delays of the transmit waveform. This waveform to achieve superposition is implemented digitally and at each element of an active array antenna. The superposition of the waveform compensates for wideband waveforms thereby reducing, or canceling the effects of transmitter leakage. Digital processing is used to generate canceling wideband waveforms for leakage in the receiver. The digitally processed waveform is converted to its analog form, then up-converted and applied to reject leakage in the receiver.

Figure 2:
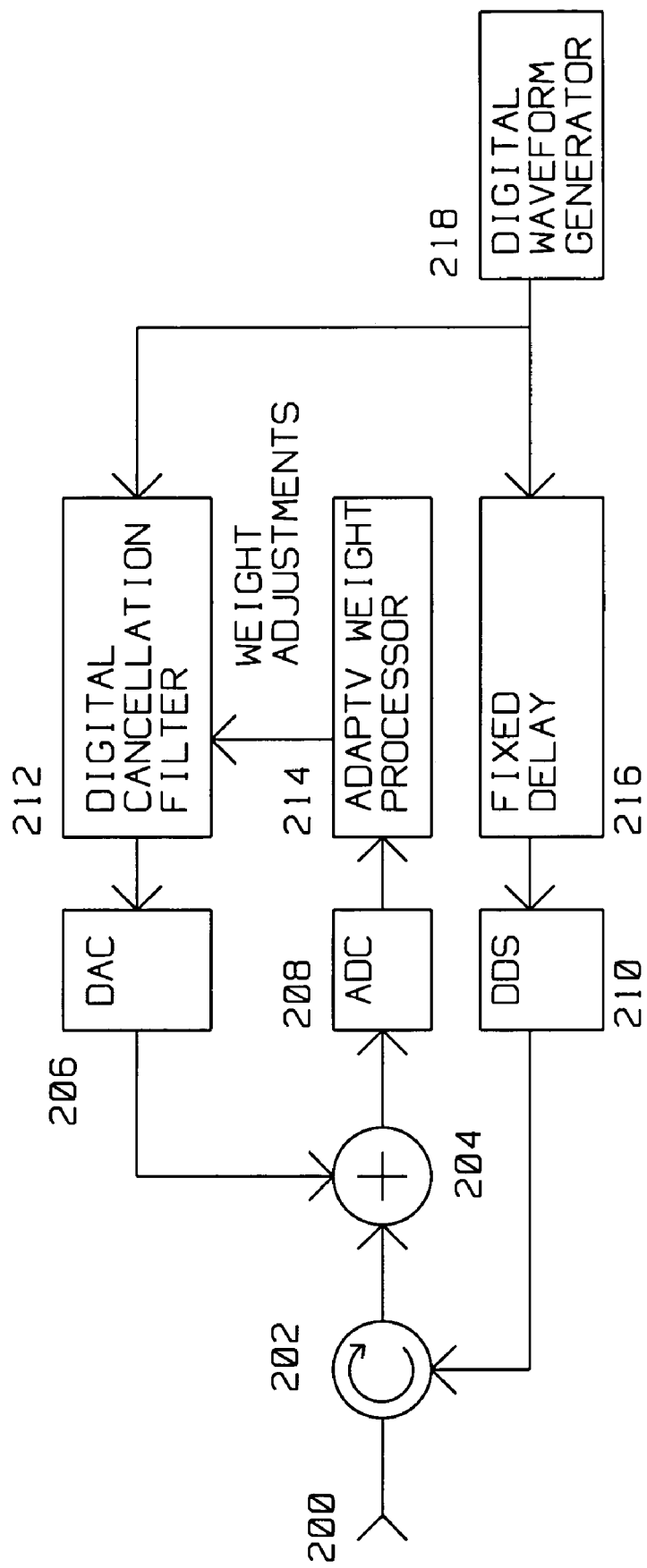
FIG. 2 shows a general outline of the present invention.

As shown in FIG. 2, the cancellation signal compensates for variations of the leakage attenuation and phase over a wide frequency range. For a wide bandwidth waveform, the canceling waveform is implemented as a superposition of individually attenuated and phase shifted delays of the transmitted waveform. In one embodiment, this generation of the canceling waveform is implemented digitally at each element and subsequently analog converted. A digital waveform generator 218 generates a replica of the transmit waveform to be canceled. Fixed delay 216 delays output from waveform generator 218 by a time delay, and feeds the delayed output to Direct Digital Synthesizer (DDS) 210. The output from DDS 210 is fed into circulator 202 where it is combined with the incoming radar signal from antenna (element) 200. The output from circulator 202 is fed to mixer 204 along with the output from Digital to Analog converter (DAC) 206. The output from mixer 204 is converted to digital form by Analog to Digital Converter (ADC) 208 for use in digital processor 214. Adaptive weight processor (digital processor) 214 generates the necessary weight adjustments to be input into Digital Cancellation filter 212, which in turn provides the digital signal to DAC 206. The digital signal provided to DAC 206 by Digital Cancellation Filter is derived from digital waveform generator 218.

For example, for a slow chirp, i.e. increasing/decreasing frequency modulated radar signal, the compensation is accomplished by a time varying amplitude and phase cancellation. For a waveform with instantaneous wide bandwidth, the canceling waveform is done as a superposition of individually attenuated and phase shifted delays of the transmitted waveform. This superposition is implemented digitally at each element, and then analog converted and inserted before the Low Noise Amplifier (LNA) and ADC 208.

Figure 3:
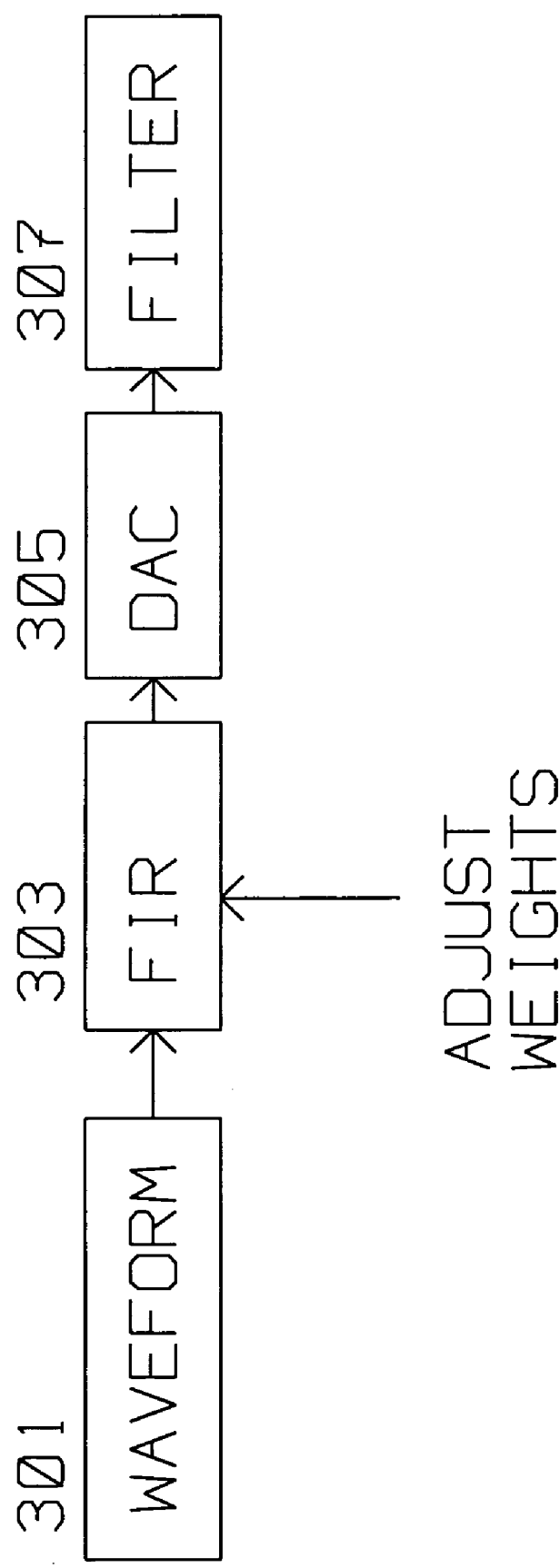
FIG. 3 shows an embodiment of the present invention using a Finite Impulse Response (FIR) filter.

FIG. 3 shows one embodiment of the digital generation of the wideband cancellation signal. The waveform from waveform generator 301 is input into finite impulse response (FIR) filter where adjustable, time varying weights are used. The variation of the weights is slow compared to the FIR bandwidth (e.g. 200 Mhz), but fast enough to keep up with the vibration of the radome beam stabilization.(e.g. 0.5 msec time constant). The output of FIR 303 is input to DAC 305, then into filter 307.

Figure 4:
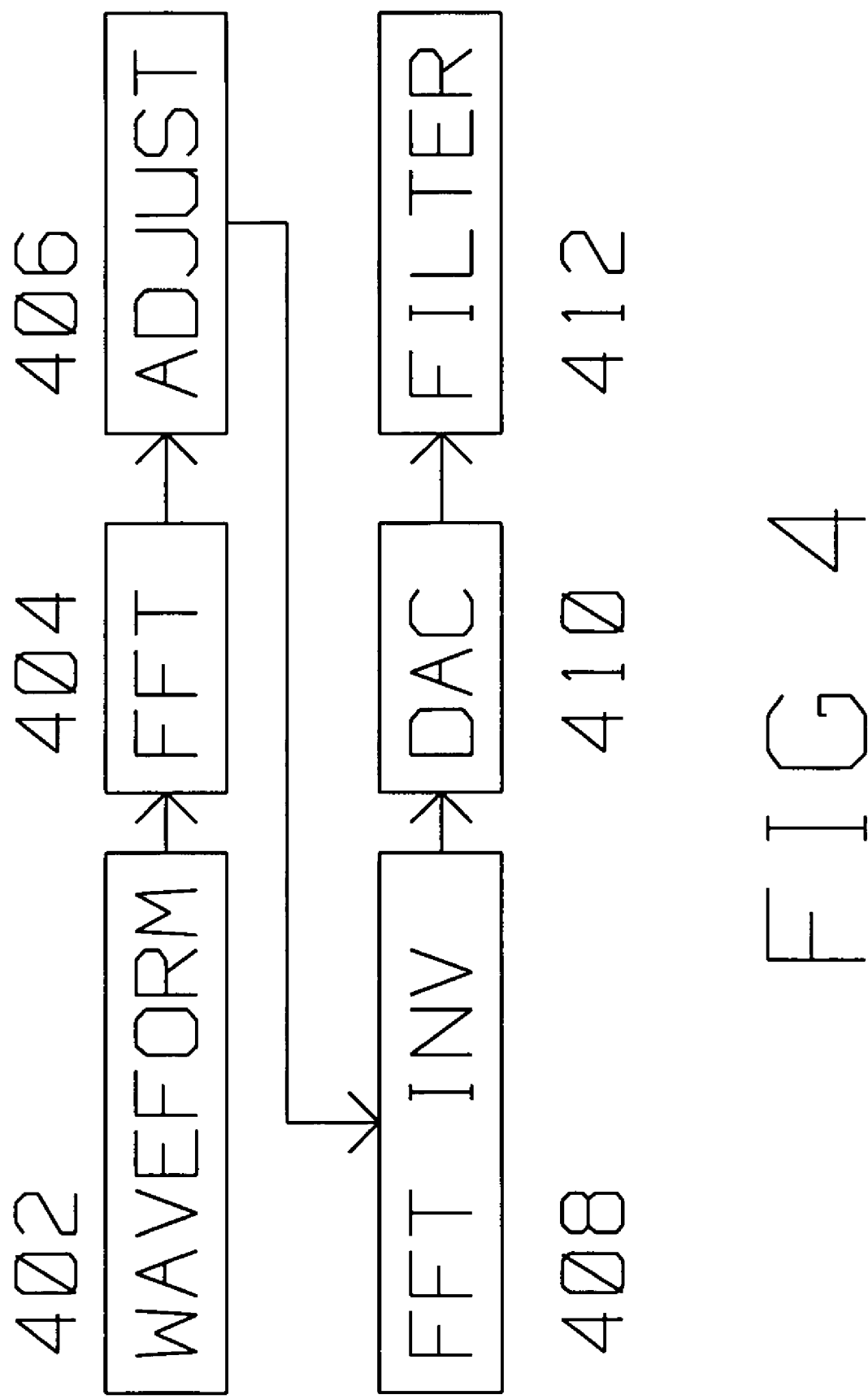
FIG. 4 shows another embodiment of the present invention using frequency domain weights for cancellation adjustments.

FIG. 4 shows another embodiment of the present invention. The waveform from waveform generator 402 is transformed using a Fast Fourier Transform in FFT 404, thus bringing the representation of the waveform in the frequency domain. Each frequency component is adjusted to reflect slowly varying variables in Adjust 406. The adjusted values are converted back to the time domain in inverse FFT-INV 408, and presented to DAC 410 for conversion to analog form. The analog waveform from DAC 410 is passed through a bandpass filter 412 to remove DAC conversion noise.

Figure 5:
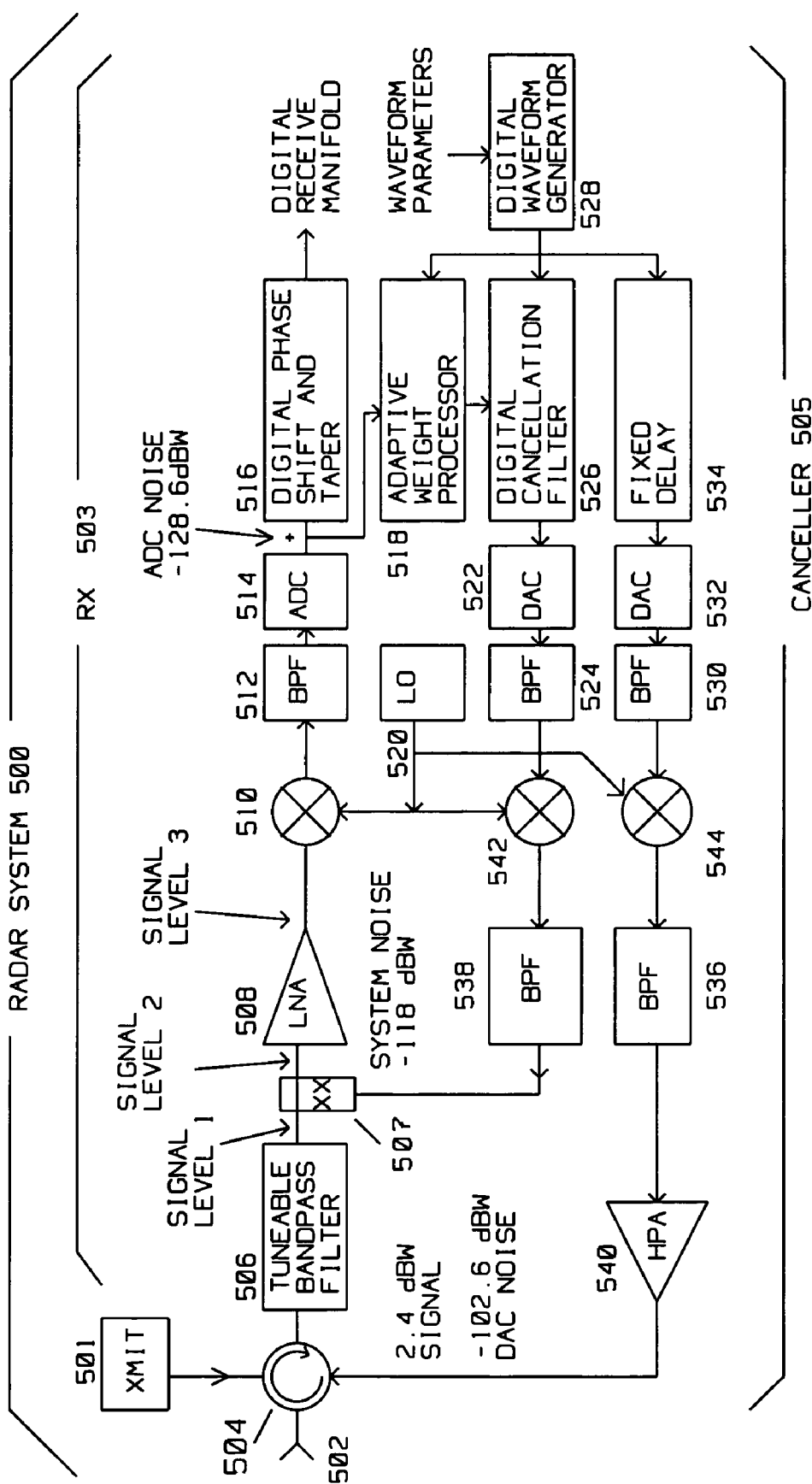
FIG. 5 shows another sample embodiment of the present invention.

A more detailed embodiment of this invention is shown in FIG. 5. Leakage cancellation includes transmit leakage (through the circulator or other path), radome reflections mismatches as well as any near range backscatter. A 7 KW STAR system is shown assuming a 0.9 mm² antenna. A postulated detection range is also assumed, at 1.75 W per element peak and average, assuming λ/2 spacing at 10 Ghz.

In STAR operation, a fraction of the transmitter power will leak or reflect back into the receiver, and thus degrade system performance. One mechanism for degrading system performance is desensitization of the receiver. To avoid desensitization, leakage is brought below the thermal noise level using the apparatus and method of this invention. Leakage is controlled at intermediate stages to minimize harmonics from non-linear elements such as the Low Noise Amplifier(s) (LNA) and analog to digital converters (ADC) used.

Leakage rejection is achieved in layered approach. First, the signal level entering the receive path is reduced to minimize radome reflection, maximize circulator isolation and maximizing element level antenna return loss. An adaptive cancellation signal is used to reduce this leakage. The cancellation is effective in the presence of vibration and rain. Where the transmit signal is at a different frequency than the received frequency (multi-frequency STAR), a receive filter with a rejection band centered on the transmit frequency further attenuates the signal. In such a configuration, good spectral purity of the transmit signal is maintained to insure the effectiveness of the receive filter in rejecting the transmit power. The product of the original leakage and the cancellation factor indicates the leakage to noise level ratio to be achieved by this invention for the receive signal to be within the dynamic range of the LNA and ADC. Digital signal processing, including pulse to pulse cancellation and range sidelobe rejection enhances the cancellation process. Digital signal processing also operates the adaptive front end cancellation. Digital signal processing aided cancellation is enhanced by wide band processing allowing formation of narrow zero range bins to estimate the leakage signal.

Total rejection required is $$R = \frac{P}{kT \cdot F \cdot B \cdot JNR}$$

where
P is the element power
kT is the ambient noise spectral density
F is the noise figure
B is channel bandwidth
JNR is allowed interference to noise ratio after signal processing For example, with
P=1.75 Watts,
kT=−204 dbW/Hz,
F=3 dB, JNR=−3.8 dB and
B=200 Mhz,
the required rejection is R=124.2 dB.

As shown in FIGS. 3 and 4, DACs are used for leakage cancellation and wave-form generation. Wideband DAC noise from the canceller and the waveform generator causes receiver desensitization/performance degradation. Noise from these sources is kept below thermal noise to preclude performance degradation. As an example, assuming a −105 dB signal to noise ratio (SNR) in each DAC, the DAC noise level is −124.6 dBW before the LNA as shown in the typical embodiment of FIG. 5. This is 6.6 dB below receiver noise.

Further in FIG. 5, antenna 502 concurrently receives and transmits radar signals and is fed from circulator 504. The output from circulator 504 is connected to Tunable Bandpass Filter 506. After Tunable Bandpass Filter 506, Signal Level 1 is −127.6 dBW leakage, −127.6dBW DAC noise. This is the leakage level after circulator 504 assuming −25 dB total contribution from radome reflections, element return and circulator 504 feed through.

After a first cancellation signal is coupled into the path to LNA 508 from Band pass filter 538, signal levels 2 are reached. At signal level 2, DAC noise is 124.6 dBW, leakage is −58.6dBW. Leakage level is after cancellation, assuming 36 dB rejection. This residual leakage signal causes harmonics to be generated in the LNA and ADC. Subsequent range/Doppler processing attenuates the leakage signal by an additional 62 dB to avoid receiver desensitization. After LNA 508, signal level 3 is reached, where third order LNA 308 harmonics are at −157.7 dbW referenced with respect the LNA 508 input. Using the same reference, the ADC noise after ADC 514 is −128.6 dbW.

Thus, FIG. 5 describes a radar system 500 emitting a radar transmit signal from transmitter 501 to antenna 502 via circulator 504. The radar system has a radar signal receiver 503 using the same antenna 502. Part of the radar system is a canceller 505 for canceling leakage from the radar transmit signal into the radar signal receiver. Uncompensated for, or uncanceled leakage, impairs operation of the radar signal receiver 503. The canceller 505 comprises the following.

a) A digital waveform generator 528 for generating a first digital signal converted to an analog waveform using DAC 532 after a fixed delay 534. Bandpass filter 530 smoothes the output from DAC 532. The output from DAC 530 is combined in Mixer 544 with Local Oscillator (LO) signal from LO 520. The output form mixer 544 is smoothed using bandpass filter 536, and the smoothed signal is applied to high power amplifier 540. The first analog waveform is similar to the radar transmit signal. The first analog waveform is amplified in high power amplifier 540 after a fixed delay 534 to generate a first cancellation signal input into circulator 504. Circulator 504 combines the first cancellation signal with the leakage to generate a first corrected signal to be input to tunable bandpass filter 506.

After tunable bandpass filter 506, a summer combines the first corrected signal from tunable bandpass filter 506 with a second cancellation signal to generate a second corrected signal. The second cancellation signal is output by Bandpass Filter 538. The input to bandpass filter 538 is obtained from mixer 542 combining the LO 520 signal with that from Bandpass filter 524. In turn, bandpass filter 524 receives an analog signal output by DAC 522. The digital input to DAC 522 is generated by Digital Cancellation Filter 526. Digital Cancellation filter is supplied by Digital Waveform Generator 528 and controlled by Adaptive Weight Processor 518.

The output from LNA 508 is mixed in mixer 510 with LO signal from LO 520 and transmitted to band pass filter 512. The output from bandpass filter 512 is converted to digital form by ADC 514 and input to digital phase shift and taper 516.

Digital cancellation filter 526 has as an input the first digital signal from digital waveform generator 528. The digital cancellation filter 526 is controlled using weight adjustments computed by a digital processor, Adaptive Weight Processor 518. Adaptive Weight Processor 518 samples the second corrected signal from ADC 514 and computes the weight adjustments used within Digital Cancellation Filter 526 to optimize said second cancellation signal.

The second cancellation signal is converted from an analog form to a digital representation for processing by the adaptive weight processor 518 using an analog to digital converter. A bandpass filter 512 smoothes the input to ADC 514.

In a typical embodiment, as shown ion FIG. 5, the second cancellation signal is digitally described by the digital cancellation filter 526 and converted into analog form by a digital to analog converter 522. The digital cancellation filter 526 is implemented using a finite impulse response filter responsive to the weight adjustments from adaptive weight processor 518.

In another embodiment, the digital cancellation filter performs a Fast Fourier Transform to generate a frequency domain signal. The weight adjustments are computed by the adaptive weight processor (digital processor) to operate on the frequency domain signal.

In another embodiment, a digitally controlled RF filter is employed to replace the DAC canceller. The waveform generator and the canceler are fed by a common DAC which allows the DAC noise to be canceled. To avoid desensitization of the receiver due to intermodulation harmonics from the LNA, the LNA harmonic level referred to the LNA input should not exceed:

$$J \; N \; Rh \cdot N$$

where

J N Rh is the allowed intermodulation to noise level referred to the LNA input,

N is the thermal noise level kT F B referred to the LNA input

The third order harmonic level J, is related to the leakage level SL, by:

$$J = \frac{(SL)^3}{(IP3)^2}$$

where IP3=LNA third order intercept referred to the LNA input. This assumes the leakage level dominates the LNA input even after cancellation Thus, $$\frac{(SL)^3}{(IP3)^2} = kTF \cdot B \cdot JNRh$$

Therefore the allowed leakage level is $$SL = (kT \; F \cdot B \cdot J \; N \; Rh \cdot (IP3)^2)^{1/3}$$

For example, with J N Rh=−10.6 db, and IP3=15 bdm, the maximum leakage level at the LNA is SL=−52.8 dbW, which is 55.2 db below the transmit power per element.

IP3 is considered because it dominates the narrowband harmonics. Other effects such as clutter modulation are also considered. The degradation dur to clutter modulation is reduced for a wide band system (e.g. 200 MHz=1 m resolution per channel).Similarly, the leakage level is maintained within the dynamic range of the ADC. The dynamic range of an I and Q ADC is:

$$DR = \frac{3}{2} \frac{(2^{nb})}{M}$$

where DR is the dynamic range, maximum input level over quantization noise;

nb is the effective number of bits;

M margin of leakage level below ADC saturation.

Assuming an I and Q ADC, the allowed leakage level SL (referred to the LNA input) should not exceed:

$$SL = JNRa \cdot kT \cdot B \cdot F \cdot DR = \frac{JNRa \cdot kT \cdot B \cdot F}{2/3 M 2^{(-nb)}}$$

where,

J N Ra is the allowed ADC quantization noise to thermal noise ratio

B is the sample rate.

For example, if M=8 db, nb=12, B=200 Mhz, J N RA=−10.6 dbW, the allowed leakage level referred back to the LNA input is SL=−62.6 dbW, which is more stringent than the requirement based on the LNA IP3, assuming no rejection is performed between the LNA and the ADC. This represents a 61 dB leakage rejection requirement at the input to the LNA.

Parameter Summary

The following summarizes values of variables for a typical embodiment of this invention:
Element power (P) 1.75 W
Noise Figure (F) 3.0 dB
Channel Bandwidth (B) 200 Mhz
Interference to Noise ratio (JNR) −3 dB
$3^{rd}$ order intercept referred to the LNA input (IP3) 15 dBm
Ambient Noise Spectral Density (kT) −204 dBW/Hz
Allowed intermodulation to noise level (J N Rh) −3.8 dB
IQ ADC sampling rate (Fs) 200 Mhz
DAC Signal to Noise Ratio 105 dB
Margin of leakage level below ADC saturation (M) 8 db
Effective number of ADC bits (nb)12
Total Rejection required $$\frac{P}{kT \cdot B \cdot F \cdot JNR}$$

124.2 dB

Allowed leakage level at the LNA for LNA intermodulation kT·B·F (J N Rh·(IP3)$^2$)$^{1/3}$−52.8 dB (55.2 dB below transmit power per element)

Allowed leakage level at the LNA for ADC noise $$\frac{JNR \cdot kT \cdot B \cdot F}{2/3 M 2^{(-nb)}}$$

is −62.6 dB (65 dB below transmit power per element)

Leakage to transmit ratio before cancellation (radome, density, circulator) −25 dB
Canceller rejection 40 dB
Required leakage rejection at the LNA −65 dB
Required leakage rejection by digital processing 65 dB
Operational Summary The leakage rejection level at the LNA input is at least 65 dB. The leakage remaining after cancellation is rejected by range and Doppler processing, since it corresponds to an echo at zero range and zero Doppler. With the present invention, the processing achieves 65 dB of rejection of the leakage signal, driving it to −9.6 dB below the thermal noise level. Thus, the total interference at the end of signal processing is 3.8 dB below thermal noise. A radome rejection level of −25 dB is also achieved. Assuming this dominates the leakage contribution, an additional 40 dB of rejection is obtained before the LNA by filters and/or cancelers.

The present invention provides for an adaptive wideband mixed digital/analog leakage cancellation having:

1) Effective digital reconstruction of non-linearity transformed RF analog transmit signal and of the front-end transmit/receive transfer function in the DSP;

2) Accurate cancellation waveform generation in the digital domain using digital multiplexing and amplification algorithms;

3) Utilization of RF analog components, DAC's and ADCs to achieve high dynamic range wideband cancellation;

4) Simple canceller calibration and training procedure using digital feedback from receiver ADCs;

5) Capability of simultaneously canceling transmit signal and unwanted received signals such as narrowband jammer and clutter chain;

6) Capability of adaptive cancellation of interferers.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this invention and definition of variables used herein.

Although presented in exemplary fashion employing specific embodiments, the disclosed structures are not intended to be so limited. For example, although a FIR embodiment for the digital cancellation filter 526 is shown in FIG. 3, and an FFT based embodiment for the cancellation filter 526 is shown in FIG. 4, other forms of synthesizing an analog or digital waveform for optimizing the leakage (second) cancellation signal can be implemented and are envisioned in the present invention.

Those skilled in the art will also appreciate that numerous changes and modifications could be made to the embodiment described herein without departing in any way from the invention.

The invention is claimed:

1. A radar system emitting a radar transmit signal, said radar system having a radar signal receiver for receiving reflected returns of said radar transmit signal, and a canceller for canceling leakage from said radar transmit signal into said radar signal receiver, said leakage impairing operation of said radar signal receiver, said canceller comprising:

a digital waveform generator for generating a first digital signal converted to an analog waveform, said analog waveform amplified after a fixed delay to generate a first cancellation signal input into a circulator, said circulator combining said first cancellation signal with said leakage to generate a first corrected signal a summer for combining said first corrected signal from said circulator with a second cancellation signal to generate a second corrected signal, said second cancellation signal generated by a digital cancellation filter, said digital cancellation filter having as an input said first digital signal from said digital waveform generator, said digital cancellation filter controlled using weight adjustments computed by an adaptive weight processor, said adaptive weight processor sampling said second corrected signal and computing said weight adjustments to optimize said second cancellation signal.

2. A radar receiver as described in claim 1 wherein said second cancellation signal is sampled from an analog form to a digital representation for processing by said adaptive weight processor using an analog to digital converter.

3. A radar receiver as described in claim 2 wherein said second cancellation signal is digitally described by said digital cancellation filter and converted into analog form by a digital to analog converter.

4. A radar receiver as described in claim 3 wherein said digital cancellation filter uses a finite impulse response filter responsive to said weight adjustments.

5. A radar receiver as described in claim 3 wherein said digital cancellation filter performs a Fast Fourier Transform to generate a frequency domain signal, and wherein said weight adjustments are computed by said adaptive weight processor to operate on said frequency domain signal.

6. A method for canceling leakage in a radar system emitting a radar transmit signal, said radar system having a radar signal receiver for receiving reflected returns of said radar transmit signal, and a canceller for canceling said leakage from said radar transmit signal into said radar signal receiver, said leakage impairing operation of said radar signal receiver, said canceller comprising the steps of:
    generating a first digital signal converted to an analog waveform, said-analog waveform amplified after a fixed delay to generate a first cancellation signal input into a circulator;
    combining said first cancellation signal with said leakage in said circulator to generate a first corrected signal;
    summing said first corrected signal from said circulator with a second cancellation signal to generate a second corrected signal, said second cancellation signal generated by a digital cancellation filter, said digital cancellation filter having as an input said first digital signal from said digital waveform generator, said digital cancellation filter controlled using weight adjustments computed by an adaptive weight processor, said adaptive weight processor sampling said second corrected signal and computing said weight adjustments to optimize said second cancellation signal.

7. A method as described in claim 6 wherein said second cancellation signal is sampled from an analog form to a digital representation for processing by said adaptive weight processor using an analog to digital converter.

8. A method as described in claim 7 wherein said second cancellation signal is digitally described by said digital cancellation filter and converted into analog form by a digital to analog converter.

9. A method as described in claim 8 wherein said digital cancellation filter uses a finite impulse response filter responsive to said weight adjustments.

10. A method as described in claim 8 wherein said digital cancellation filter performs a Fast Fourier Transform to generate a frequency domain signal, and wherein said weight adjustments are computed by said adaptive weight processor to operate on said frequency domain signal.

* * * * *